(12) United States Patent
Jameson et al.

(10) Patent No.: US 11,328,263 B2
(45) Date of Patent: May 10, 2022

(54) USER INTERFACES FOR FILTERING ELECTRONIC CALENDAR DATA SETS

(71) Applicant: Microsoft Technology Licensing, LLC, Redmond, WA (US)

(72) Inventors: Rachel Jameson, Redmond, WA (US); Giancarlo Cozzi-Mendez, Redmond, WA (US); Sreeram Nivarthi, Redmond, WA (US); Anil Kumar V Revuru, Redmond, WA (US); Marilyn N Harris, Redmond, WA (US); Harsh Shrimal, Redmond, WA (US); Andrew C. Owen, Redmond, WA (US); Firdosh R Ghyara, Redmond, WA (US); Rajarshi Ray, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 233 days.

(21) Appl. No.: 16/282,053

(22) Filed: Feb. 21, 2019

(65) Prior Publication Data
US 2020/0272998 A1 Aug. 27, 2020

(51) Int. Cl.
*G06Q 10/10* (2012.01)
*G06F 16/34* (2019.01)
(Continued)

(52) U.S. Cl.
CPC ....... *G06Q 10/1095* (2013.01); *G06F 16/335* (2019.01); *G06F 16/3334* (2019.01); *G06F 16/34* (2019.01)

(58) Field of Classification Search
None
See application file for complete search history.

(56) References Cited

U.S. PATENT DOCUMENTS

| 2013/0232150 | A1* | 9/2013 | Gingras | ............... G06F 16/285 707/740 |
| 2014/0229614 | A1 | 8/2014 | Aggarwal et al. | |

(Continued)

OTHER PUBLICATIONS

Screen captures from YouTube video clip entitled "An Introduction to Workplace Analytics for Office 365," 7 pages, uploaded on Jul. 5, 2017 by user "Microsoft Mechanics." Retrieved from Internet: <https://www.youtube.com/watch?v=xiRb8T4ohFc>.*

(Continued)

*Primary Examiner* — Susanna M. Diaz
(74) *Attorney, Agent, or Firm* — Schwegman Lundberg & Woessner, P.A.

(57) ABSTRACT

A method may include receiving a request to save the exception to the first rule; in response to the request, updating the user interface, wherein: the first portion is updated to include a parameter of a second rule to exclude a subset of meetings from the ECDS; the second portion is updated to include an impact metric that indicates a percentage of meetings excluded from the ECDS based on an application of the second rule to the ECDS; and the third portion is updated to include selectable elements for creating an exception to the second rule; and a fourth portion of the user interface includes an indication of a number of meetings excluded from the ECDS based on application of the first rule with any exceptions to the first rule.

20 Claims, 9 Drawing Sheets

(51) Int. Cl.
*G06F 16/335* (2019.01)
*G06F 16/33* (2019.01)

(56) References Cited

U.S. PATENT DOCUMENTS

| | | | | |
|---|---|---|---|---|
| 2016/0371334 | A1* | 12/2016 | Grus | G06Q 10/107 |
| 2017/0061393 | A1* | 3/2017 | Park | G06F 3/0482 |
| 2017/0249597 | A1* | 8/2017 | Wang | G09B 5/00 |
| 2018/0082265 | A1* | 3/2018 | Chan | G06Q 10/1095 |
| 2019/0251400 | A1* | 8/2019 | Takahashi | G06F 16/9024 |

OTHER PUBLICATIONS

Tushman et al. "Email and Calendar Data Are Helping Firms Understand How Employees Work." Harvard Business Review. Aug. 28, 2017. Retrieved from the Internet <URL: https://hbr.org/2017/08/email-and-calendar-data-are-helping-firms-understand-how-employees-work>. (Year: 2017).*

"Advanced Analytics—Meetings", Retrieved From: https://www.vyopta.com/support/docs/meetings-advanced-analytics/, Retrieved on: Jan. 21, 2019, 7 Pages.

"Meeting Analytics", Retrieved From: https://web.archive.org/web/20160201212729/https://www.meetingbooster.com/meeting-analytics.php, Feb. 1, 2016, 5 Pages.

"Meeting Room & Workplace Analytics", Retrieved From: https://web.archive.org/web/20181031060259/https://www.teem.com/solutions/workplace-analytics/, Oct. 31, 2018, 13 Pages.

"Non-Provisional Application Filed in U.S. Appl. No. 16/197,980", filed Nov. 21, 2018, 37 Pages.

Izso, et al., "Meeting exclusions in Workplace Analytics", Retrieved From: https://docs.microsoft.com/en-us/workplace-analytics/use/understand-meeting-exclusions, Feb. 14, 2018, 4 Pages.

Santaferraro, John, "Meeting analytics: The future of managing event data is here", Retrieved From: https://www.corporatemeetingsnetwork.ca/2017/02/07/meeting-analytics-future-managing-event-data/, Feb. 7, 2017, 3 Pages.

Schafer, et al., "Meeting exclusion rules: Walkthroughs", Retrieved From: https://docs.microsoft.com/en-us/workplace-analytics/tutorials/meeting-exclusion-rules, Dec. 3, 2018, 9 Pages.

Tobin, et al., "Configure Workplace Analytics settings", Retrieved From: https://docs.microsoft.com/en-us/workplace-analytics/use/settings, Nov. 16, 2018, 10 Pages.

* cited by examiner

FIG. 5

CANCELED MEETINGS  APPOINTMENTS  LARGE MEETINGS  LONG MEETINGS  TOPICS

Summary of Meetings that remain. After each exclusion is applied, this summary updates to reflect what remains in your analysis Attendee Meeting Hours — 302
56.3%  88.6M of 157M Number or Meetings
48.4%  13.6M of 28.1M

LARGE MEETINGS

Meetings that are extremely large often do not reflect an organization's collaboration habits Exclude meetings where:
Number of attendees > 25 — 502

POTENTIAL IMPACT OF EXCLUSION

This is what would be removed from your data if you use this exclusion

Excluded meeting hours
4%
6M out of 157M total meeting hours

Excluded number of meetings
4.4%
1M out of 28M total meeting

— 310

Search for a keyword

☒ Use this exclusion

[ NEXT ]   [ CANCEL ]

EXCEPTIONS
Most impactful keywords from meeting subjects where attendees > 25 lunch     sprint
cloud
build  oof  community
go      monthly
     shiproom

FIG. 7

USER INTERFACES FOR FILTERING ELECTRONIC CALENDAR DATA SETS

BACKGROUND

Calendar services permit users of an organization to manage electronic calendars. An entry on a calendar may be considered a meeting and may include one or more attendees. A meeting may also have a category in some instances. It is also common for a meeting to have a subject and a body. The body may be used to detail what the meeting is about and may be shown to invitees of the meeting. Analyzing the meetings in a calendar service may permit collaboration patterns to be determined between users.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

FIG. 5 is a user interface for customizing a large meeting exclusion, according to various examples.

FIG. 7 is a user interface for customizing a topics exclusion, according to various examples.

DETAILED DESCRIPTION

Figure 1:
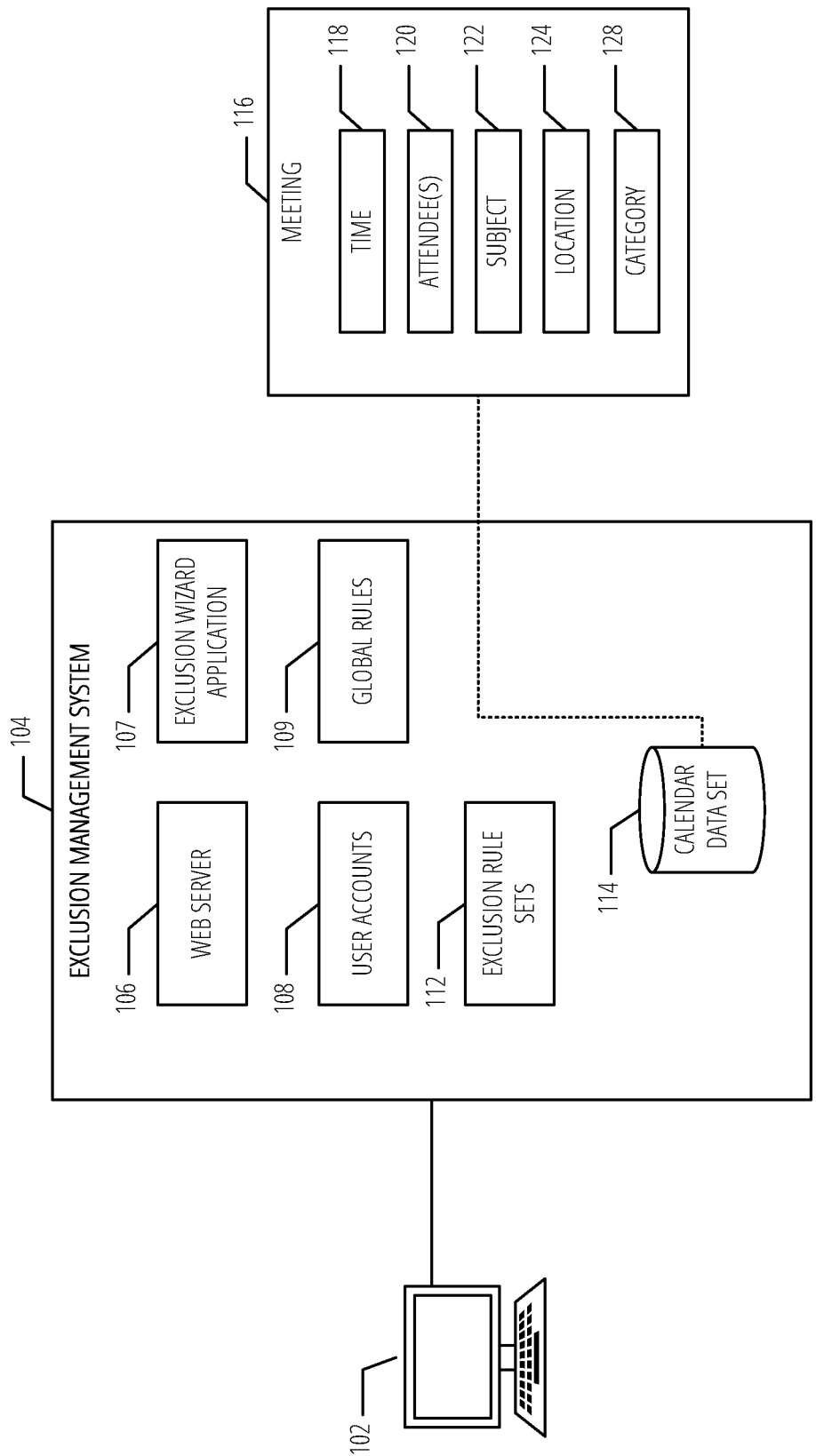
FIG. 1 is diagram illustrating components of an exclusion management system 104, according to various examples.

In the following description, for purposes of explanation, numerous specific details are set forth in order to provide a thorough understanding of some example embodiments. It will be evident, however, to one skilled in the art that the present invention may be practiced without these specific details.

Throughout this disclosure, electronic actions may be taken by components in response to different variable values (e.g., thresholds, user preferences, etc.). As a matter of convenience, this disclosure does not always detail where the variables are stored or how they are retrieved. In such instances, it may be assumed that the variables are stored on a storage device accessible by the component via an API or other program communication method. Similarly, the variables may be assumed to have a default values should a specific value not be described. User interfaces may be provided for an end-user or administrator to edit the variable values in some instances.

One of the technical challenges of analyzing large data sets (e.g., millions of data points) is ensuring that the analyzed data set excludes data that is irrelevant to the analysis or may skew the analysis. For example, an enterprise may analyze collaboration patterns between its employees to determine which groups of people work together the most often. The results of the analysis may be used to improve software applications of the enterprise. For example, if Alice and Bob often work together, Bob's e-mail application may present e-mails from Alice more prominently or Bob's to-do manager may present to-dos from Alice higher than other users. Other improvements to software application may be made as well. Other types of information may be learned by analyzing large data sets as may be appreciated by those skilled in the art. Finally, although discussed in the context of an enterprise, the techniques discussed herein may be applied to non-enterprise environments as well.

Continuing the collaboration example, a plethora of data sources may be analyzed to determine collaboration patterns between users (e.g., employees). One such data source may be electronic calendar data. An enterprise may utilize a calendar service (e.g., MICROSOFT EXCHANGE SERVER® or GOOGLE GSUITE®) to manage the electronic calendars of its users. Each user may have their own calendar and may accept meetings, create their own meetings, etc. As used herein a meeting may be considered a block of time on a user's calendar. Thus, a meeting may include a single attendee—the user—in some instances.

In theory, each of the calendars only includes work meetings; however, in practice, many of the calendars will include non-work meetings (e.g., personal appointments). In addition to non-work meetings, some meetings should be excluded from the analysis to avoid skewing the collaboration data. For example, meetings with a large number of attendees (e.g., over 100) are likely company-wide meetings and may lead to inaccurate results.

Accordingly, before analyzing a calendar data set—the data set included the meetings for all users in some instances—some of the meetings may be excluded. The meetings may be excluded by applying an exclusion rule set of one or more exclusion rules. For example, an exclusion rule may exclude meetings with a single attendee, meetings with attendees above a certain threshold, cancelled meetings, durations above a certain length, or meetings with certain keywords (e.g., a single word) or phrases (multiple words) in the subject line.

After applying the exclusion rule set there some meetings may be excluded that were actual work and relevant to collaboration data (or other analysis). Accordingly, one or more exceptions may be made to an exclusion rule. For example, meetings with a single attendee that include a keyword of "training" in the subject line may be included for analysis purposes.

One of the challenges with creating exclusion rules and exceptions is that there may be no insight into how an exclusion—or an exception to that exclusion—will affect the total volume of meetings. This may lead to including meetings that may be better left excluded. In many instances a set of exceptions to an exclusion rules set may be created and then the analysis may be run—only to find out that the exceptions brought back a higher percentage of meetings than wanted. Therefore, the exceptions may be changed with the analysis repeated once again. The process may be repeated until a user creating the exceptions is satisfied. This process may not only be inefficient from a time perspective but is also expensive in terms of computing resources (e.g., processing needs, etc.).

In view of the above problems, systems and methods are described that provide an improved way to create exclusion and exception rule sets. The systems and methods provide many technical improvements by providing user interfaces that indicate, in real-time, the impact that changes to exclusion and exception rules have on a calendar data set. The user interfaces are also specifically configured to provide users visual and textual indicators on the impact of the exclusions/exceptions as discussed in further detail herein. By having the feedback in real-time, computing resources may not be wasted by performing analysis on an under or over-inclusive calendar data set. The user interfaces may also be configured to visually indicate the correlation between a keyword in the subject and the volume of meetings that include the keyword with respect to individual exclusion rules. The user interfaces may be an improvement over existing user interfaces by presenting a limited set of information about an exclusion (e.g., the most common keywords used in a subject line) to avoid inefficiencies of iterating through potential rules and exclusions by guessing frequently used keywords.

FIG. 1 is diagram illustrating components of an exclusion management system 104, according to various examples. FIG. 1 includes client device 102 (e.g., a mobile phone, laptop, desktop computer), exclusion management system 104, and meeting data structure 116. Exclusion management system 104 is illustrated as including components of web server 106, exclusion wizard application 107, user accounts 108, global rules 109, exclusion rule sets 112, and calendar data set 114. Exclusion management system 104 may be part of a larger enterprise set of services or used as a standalone service accessible via an Application Programming Interface (API). In some examples, exclusion management system 104 may be part of client device 102.

Although exclusion management system 104 is illustrated a series of separate components, alternative configurations may also be permissible. For example, calendar data set 114 and exclusion rule sets 112 may be stored in a single database. The functionality described with respect to the components and system as. whole may be performed by one or more functional units. A functional unit may represent computer program code that is executable by a processing unit (e.g., a core of a general-purpose computer processor, a graphical processing unit, an application specific integrated circuit, etc). The program code may be stored on a storage device and loaded into a memory of the processing unit for execution. Portions of the program code may be executed in a parallel across multiple processing units. Execution of the code may be performed on a single device or distributed across multiple devices. In some example, the program code is executed on a cloud platform (e.g., MICROSOFT AZURE® and AMAZON EC2®) using shared computing infrastructure.

Calendar data set 114 may store a number of meeting entries retrieved from an electronic calendar service (not shown). Periodically (e.g., daily) exclusion management system 104 may query a calendar service for meetings entries for a group of users, which may be stored in calendar data set 114. A meeting entry may be represented by a data structure such as meeting data structure 116. Meeting data structure 116 is illustrated as including a number of fields: time field 118, attendee field 120, subject field 122, location field 124, and category field 128. The number and content of the fields are for illustration purposes only—more or fewer fields may be included in a meeting data structure. Time field 118 may include a start time and end time of a meeting. Time field 118 may be used to calculate a duration of a meeting. In various examples, the body of a meeting (e.g., the detailed description of the meeting that may be sent in a meeting request) may be excluded.

Data used in client device 102 may be organized and stored in a variety of manners. For convenience, the organized collection of data is often described in the context of a database(s) such as calendar data set 114. The specific storage layout and model used in a database may take a number of forms—indeed, a database may utilize multiple models. The database may be, but is not limited to, a relational database (e.g., SQL), non-relational database (NoSQL) a flat file database, object model, document details model, graph database, shared ledger (e.g., blockchain), or a file system hierarchy. The database may store data on one or more storage devices (e.g., a hard disk, random access memory (RAM), etc.). The storage devices may be in standalone arrays, part of one or more servers, and may be located in one or more geographic areas. Queries may made to a database to retrieve data. For example, an SQL query may be used to retrieve data from a relational database.

Global rules 109 may be rules that filter out meeting entries from calendar data set 114 before customizing exceptions and exclusions. A global rule may be defined as a logical statement that compares an attribute of a meeting to a value. For example, a global rule may exclude meetings that have been categorized as private. Another global rule may filter out meetings that have personally identifiable information according to a regular expression or other matching (e.g., certain phrases) in the subject line or other field of a meeting entry. In various example, when exclusion management system 104 queries the calendar service, the query is formatted to request meetings that do not match any of the rules in global rules 109. In such an instance the "filtering" is performed at the time of querying.

User accounts 108 may include account data for users of exclusion management system 104. Users may include users that use the analysis of exclusion management system 104, as well as users that have created/are attending meetings. For example, a first user, Alice, may want to run an analysis to see collaboration data for employees of company Acme. Alice may or may not be an employee of Acme.

An exclusion rule set may be stored as part of exclusion rule sets 112. An exclusion rule may be defined according to one or more comparisons between an attribute of a meeting—which may be one of the fields in meeting data structure 116—and a value. For example, an exclusion rule may indicate that if the number of attendees is equal to one, to exclude the meeting for analysis purposes. Another exclusion rule may compare a keyword to words in a subject, and, if there is a match between one of the words and the keyword, exclude the meeting. One or more exclusion rules may be combined to create an exclusion rule set.

An exclusion rule may also have one or more exceptions applied to it. An exception rule may be used to include a meeting that that would normally be excluded based on an exclusion rule in an exclusion rule set. As with an exclusion rule, an exception rule may be defined according to a comparison between an attribute and a value of a meeting. For examples, a keyword exception rule may be used to include meetings with certain keywords or phrases in the subject line. In various examples, a keyword may be considered a single word and a phrase may be a combination of two or more keywords.

An exclusion rule set and its associated exceptions may be associated with a user account in user accounts 108 in various examples. Accordingly, when a user logs into exclusion management system 104, the exclusion rule set associated with the user may be used as the basis for an analysis. In some examples, an exclusion rule set may be associated with multiple accounts (e.g., all users in a company) such that it is the default set of exclusion rules used before any exceptions are applied.

A user may have multiple exclusion rule sets generated using exclusion wizard application 107, served via web server 106, as discussed further herein. When a user logs into exclusion management system 104, options may be presented to analyze calendar data using one of the exclusion rule sets associated with the user, edit an existing exclusion rule set, or create a new exclusion rule set.

Exclusion wizard application 107 may be hosted at exclusion management system 104 and used to present a series of UIs to enable a user to create, use, and edit exception rule sets 110. Exclusion wizard application 107 may present real-time information on how a change to an exclusion rule affects the number of meetings that may eventually be analyzed. At the end of creating an exclusion rule set, exclusion wizard application 107 may present a summary of how many meetings and many hours are excluded, broken down by each exclusion rule in the set.

Web server 106 may be used to exchange information with users via a network such as the Internet. Although generally discussed in the context of delivering webpages via the Hypertext Transfer Protocol (HTTP), other network protocols may be utilized by web servers 110 (e.g., File Transfer Protocol, Telnet, Secure Shell, etc.). A user may enter in a uniform resource identifier (URI) into a network browser (e.g., the INTERNET EXPLORER® web browser by Microsoft Corporation or SAFARI® web browser by Apple Inc.) that corresponds to the logical location (e.g., an Internet Protocol address) of a web page hosted by web server 106. In response, web server 106 may transmit the web page that is rendered on a display device of client device 102 (e.g., a mobile phone, desktop computer, etc.). In this disclosure, presenting data to a user may include transmitting the web page or data for the web page from web server 106 to client device 102.

A web server may enable a user to interact with one or more web applications provided in a transmitted web page. A web application, such as exclusion wizard application 107, may provide user interface (UI) components that are rendered on a display device of a computing device. The user may interact (e.g., select, move, enter text into) with the UI components, and, based on the interaction, the web application may update one or more portions of the web page. A web application may be executed in whole, or in part, locally on client device 102. The web application may populate the UI components with data from external sources or a web server in various examples. The web application may issue API calls to retrieve the data. Conversely, data entered by a user into a UI component may be transmitted using an API call back to the web server.

Figure 2:
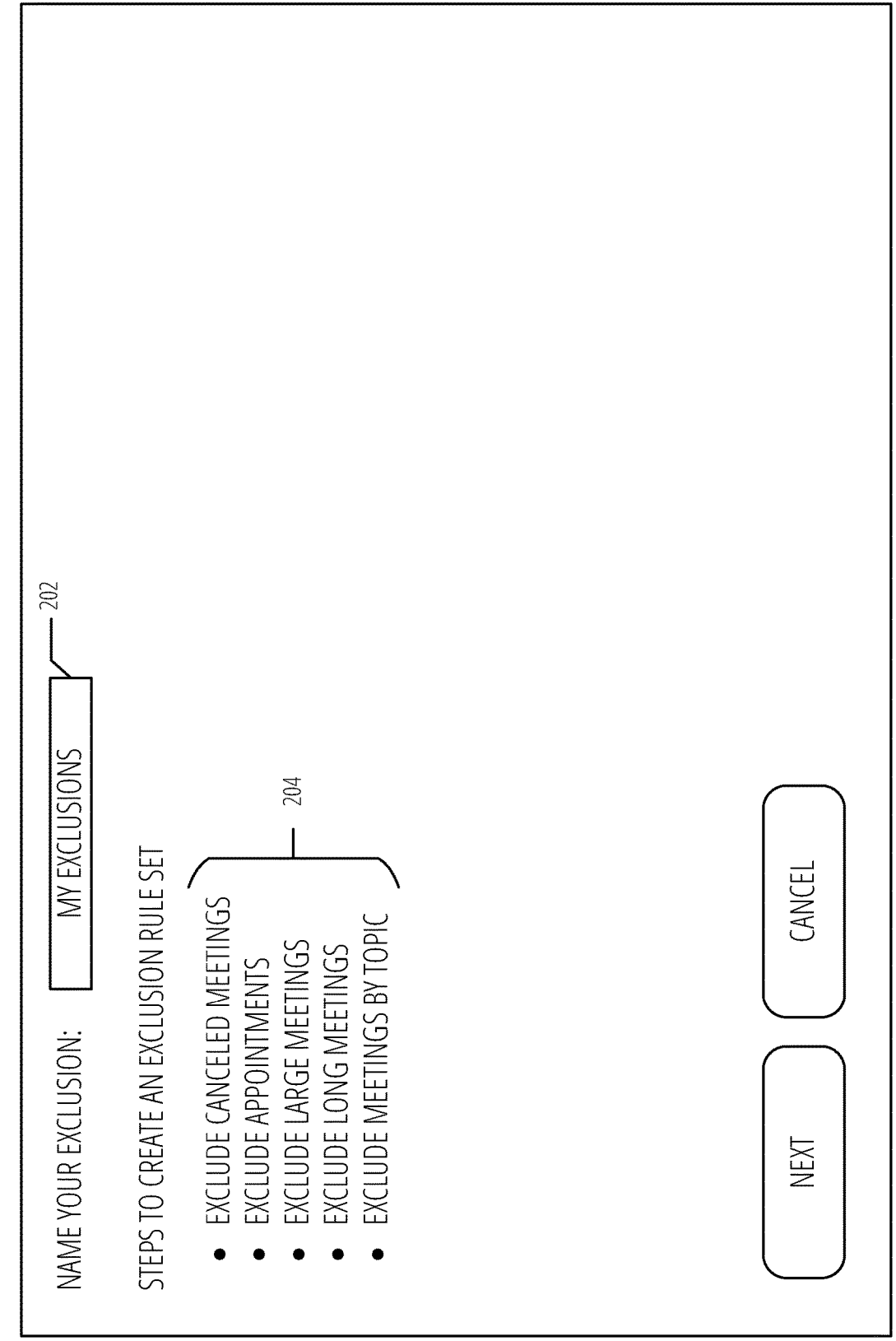
FIG. 2 is a user interface illustrating an overview of creating a new exclusion rule set according to various examples.

In various examples, client device 102 and exclusion management system 104 may communicate via one or more networks (not illustrated). A network may include local-area networks (LAN), wide-area networks (WAN), wireless networks (e.g., 802.11 or cellular network), the Public Switched Telephone Network (PSTN) network, ad hoc networks, cellular, personal area networks or peer-to-peer (e.g., Bluetooth®, Wi-Fi Direct), or other combinations or permutations of network protocols and network types. A network may include a single local area network (LAN) or wide-area network (WAN), or combinations of LAN's or WAN's, such as the Internet FIGS. 2-7 illustrate example user interfaces for creating an exclusion rule set, according to various examples. FIG. 2 is a user interface 200 illustrating an overview of creating a new exclusion rule set. User interface 200 may be displayed on a computing device such as client device 102 after a user enters in their credentials to exclusion wizard application 107. Upon logging in, an option may be presented (not shown) to create a new exclusion rule set, after which user interface 200 may be presented. The user may enter in a name into input box 202 for the exclusion rule set. The name may be used to refer to the exclusion rule set at a later time for analysis of a calendar data set, for example.

User interface 200 may also display exclusion rule categories 204. Exclusion rule categories 204 may represent a default set of exclusion rules that may be modified while creating the exclusion rule set. As illustrated, there are five categories: canceled meetings, appointments, large meetings, long meetings, and topics. Each of these categories is described in turn in FIGS. 3-7. Exclusion wizard application 107 may have more of fewer categories depending on the default exclusion rules. A user may begin customizing the exclusion rules with exceptions by using an input device to select, click, etc., the "Next" button.

Figure 3:
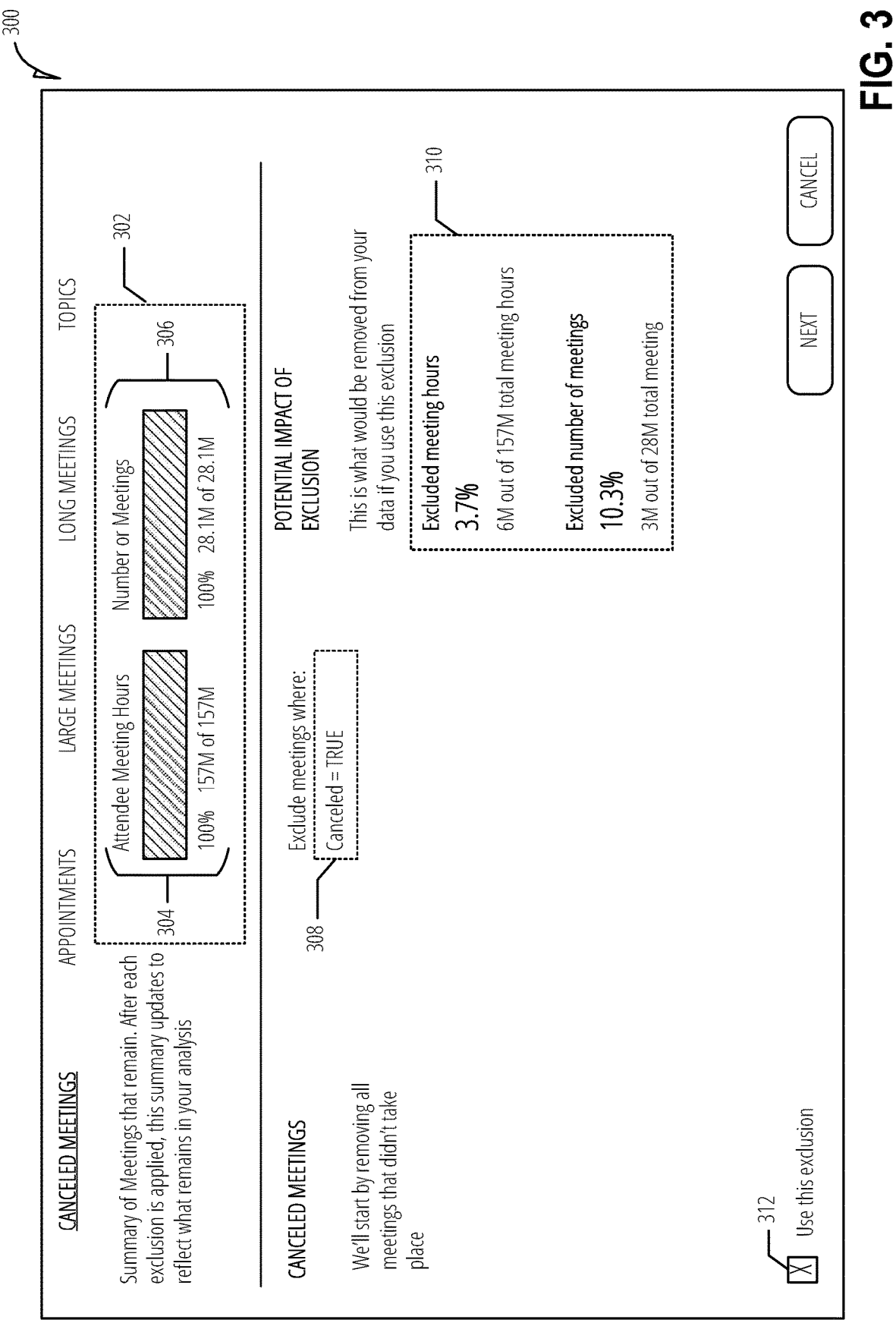
FIG. 3 is a user interface for customizing a canceled meeting exclusion, according to various examples.

FIG. 3 is a user interface 300 for customizing a canceled meeting exclusion, according to various examples. User interface 300 may be presented in response selection of the "Next" button in FIG. 2, according to various examples. User interface 300 may be described an including a number of separate portions.

For example, portion 302 may include one or more indications of the overall volume of meetings in calendar data set (e.g., calendar data set 114) that may be used for analysis purposes. The calendar data set may include all the meetings for an enterprise minus any of the meetings that match a global rule. The indications may be visual or textual. For example, indication 304 includes a horizontal bar chart that is 100% full—with an accompanying textual description of the number of attendee meetings hours are in the calendar data set. Indication 306 visually and textually depicts the number of meetings in the calendar data set. The values in indication 304 and indication 306 may be determined in real-time by querying the calendar data set. Although bar charts are used, other visualizations may be used without departing from the scope of this disclosure such as pie charts, colors, etc.

Another portion, such as portion 308, may identify the criteria (which may be a single criterion as used herein) for the current exclusion rule. The current exclusion rule may be emphasized, such as by bolding it in a list of exclusion rules (as depicted in FIG. 3). As illustrated the criteria for the canceled meeting exclusion is checking if a meeting has been canceled. More specifically, portion 308 indicates that when a parameter of "canceled" equals TRUE in a meeting data structure, the meeting will be excluded from analysis, in various examples. A parameter may be considered an attribute of a meeting in various examples. The criteria for an exclusion rule may generally be customized; however, in FIG. 3 there is only an option 312 to use or not use the exclusion rule.

Portion 310 includes impact metrics with respect to the current exclusion rule. As with indication 304 and indication 306, impact metrics may be determined in real time by querying the calendar data set. The results of the querying may indicate or be used to calculate the percentage of meetings and meeting hours that meet the exclusion rule criteria. The impact metric is depicted textually in FIG. 3, but visual representations may be used without departing from the scope of this disclosure. A user may progress to the next exclusion rule (FIG. 4) by selecting the next button.

Figure 4:
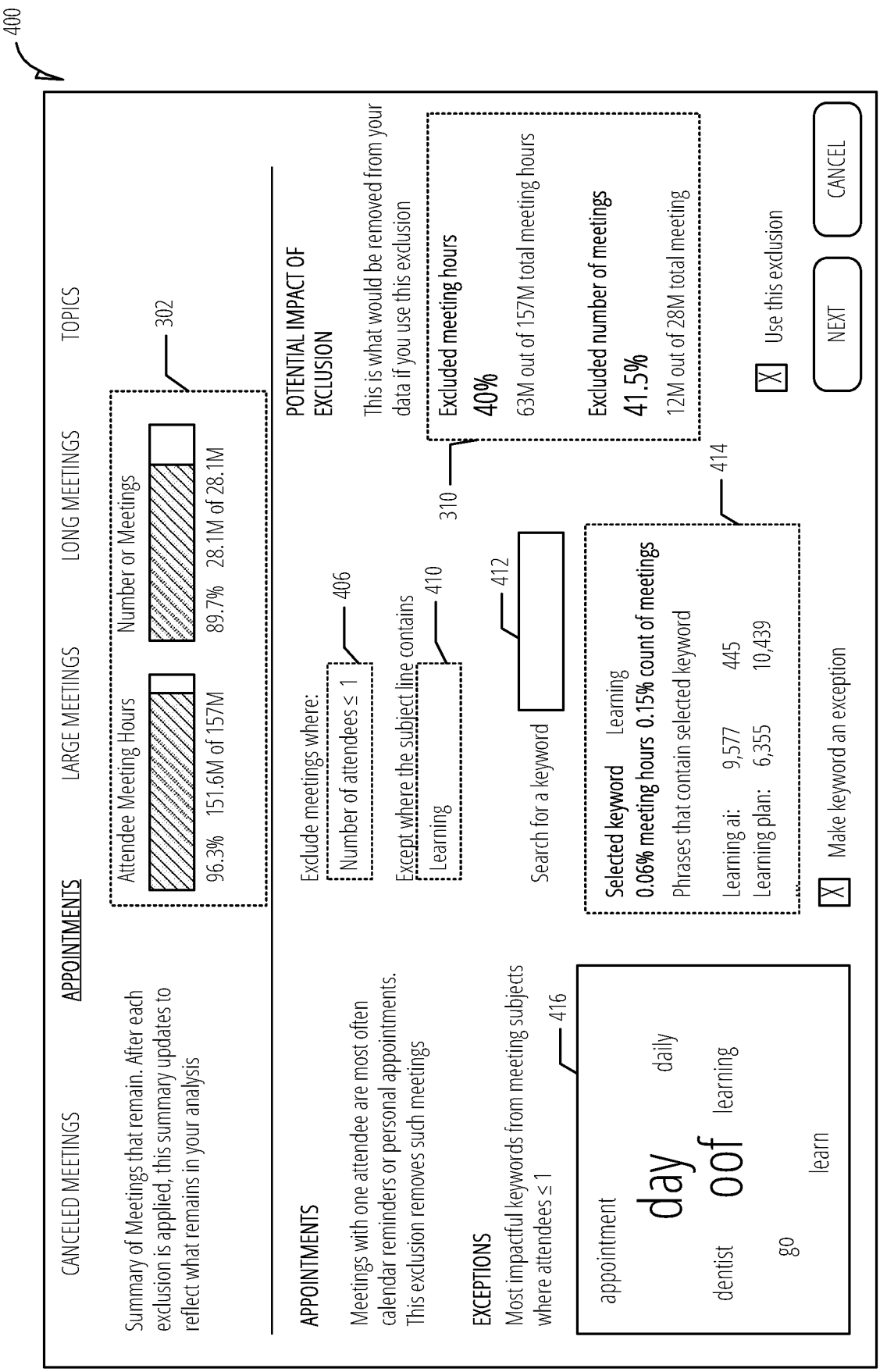
FIG. 4 is a user interface for customizing an appointment meeting exclusion, according to various examples.

FIG. 4 is a user interface 400 for customizing an appointment meeting exclusion, according to various examples. Portion 302 has been updated to reflect the application the canceled meetings. Accordingly, portion 302 shows the culminative effect of each of the exclusion rules that have been applied, in various examples. As shown, once the canceled meeting exclusion has been applied 96.3% of the attendee meeting hours and 89.7% meetings remain.

The impact metrics in portion 310 have been updated to reflect the number of meetings excluded based on the displayed exclusion rule criteria. Accordingly, in contrast to the indications in portion 302, portion 310 is reflective only of the current exclusion rule. Portion 310 may be updated based on changes to the displayed exclusion and exception criteria.

The appointment meeting exclusion has default criteria 406 where the number of attendees is ≤1. The user may change the value of the number of attendees in various examples. Exceptions may be made to the exclusion rule in various examples. User interface 400 shows keyword exception 410 but other exception types may be used (e.g., days, months, certain attendees, etc.).

A keyword exception may be used to include meetings with meetings that have a subject that includes the keyword that would otherwise be excluded by the current exclusion rule. User interface 400 may present a number of aids to assist a user in making informed choices for the keyword exception. For example, word cloud 416 may display the most frequently (e.g., top 50) used keywords in subject lines of meetings that are subject to the exclusion rule. Thus, in this example, the keywords are based on subject lines of meetings that have less than or equal to one attendee. The size of a word in word cloud 416 may be based on its relative frequency compared to other words. For example, a default font size may be used all keywords within one standard deviation of the average, a larger font size for keywords greater than one standard deviation, etc. Other word visualization techniques may be used such as tables, charts, etc.

A user may interact with a word by clicking or hovering over it. If a user hovers over a keyword, popup information may appear near that keyword that indicates the number and hours of meetings that include that individual keyword. The number and hours may be based on the filtered calendar set. Accordingly, if the "day" keyword is selected, the number of and hours would reflect meetings that include day where there the number of attendees is less than or equal to one.

A user may also click a keyword to select it. Upon selecting a keyword, portion 414 may updated to include information on the keyword. The information may include the phrases that include the keyword and the number meetings and meeting hours for that phrase based on the filtered calendar set. A percentage may also be shown that reflect the number of uses of a phrase containing the keyword divided by the total number of meetings that include the keyword. This information may be useful if a user is trying to decide how "work" related a keyword may be.

The information may also include the percentage of meeting hours and count of hours with respect to the nonfiltered calendar data. Accordingly, 0.06% of meeting hours of the entire calendar set have subject lines that include "learning" where there the number of attendees is less than or equal to one. In other examples, the percentage may for the entire calendar data set. The information in portion 414—much like the other displayed data—may be determined by issuing a query to the calendar data set. A user may also search for a keyword using 412 instead of clicking one in word cloud 416.

An option may also be presented to make the keyword an exception. Upon selecting the option, keyword exception 410 may be updated to indicate learning is an exception keyword. Multiple exceptions may be used with different keywords. In some examples, phrases may be used as exceptions. Keyword may be removed as exception by clicking an 'x' (not shown) next to a keywork in keyword exception 410. Additionally, adding a keyword as an exception updates portion 310—in effect, adding back in some of the excluded meetings. Portion 310 may remain unchanged until a user clicks the next button.

FIG. 5 is a user interface 500 for customizing a large meeting exclusion, according to various examples. User interface 500 is organized in a similar manner to user interface 400. Portion 302 has been updated to indicate the number of meeting and meeting hours remaining after an application of the canceled meeting and appointment exclusions.

Portion 310 has been updated to reflect the number of meetings excluded by the large meeting criteria of more than 25 attendees. A user may change the criteria and portion 310 may update in response to the change with requiring reloading the page, in various examples. As discussed previously, portion 302 may not change until a user indicates they are done customizing the large meeting exclusion by clicking the next button. User interface 500 does not include any exceptions; however, a word cloud and keyword search are presented if the user wishes to create an exception.

Figure 6:
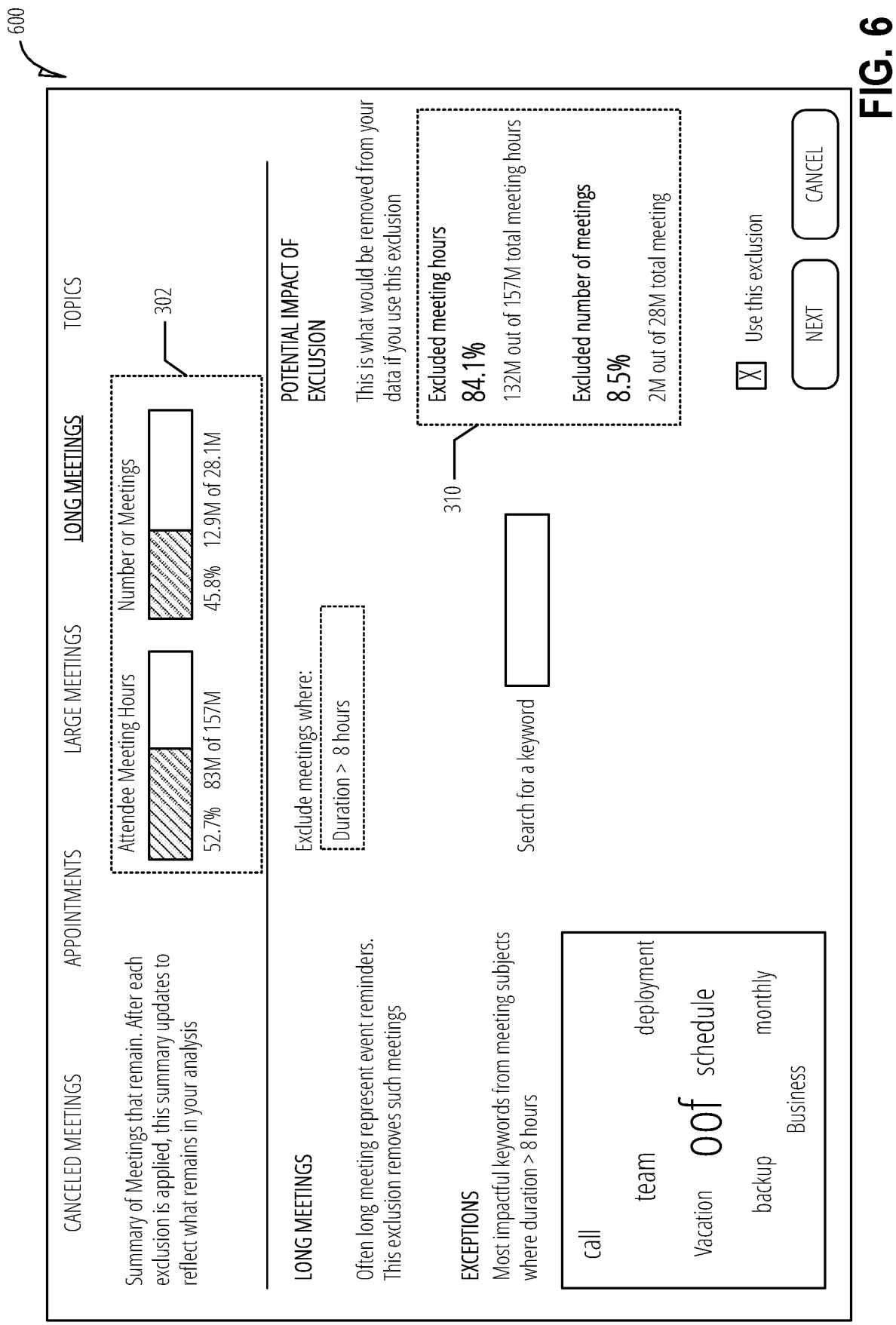
FIG. 6 is a user interface for customizing a long meeting exclusion, according to various examples

FIG. 6 is a user interface 600 for customizing a long meeting exclusion, according to various examples. User interface 600 is organized in a similar manner to user interface 400. Portion 302 has been updated to indicate the number of meeting and meeting hours remaining after an application of the canceled meeting, appointment, and large meeting exclusions.

Portion 310 has been updated to reflect the number of meetings excluded by the meeting having a duration of longer than 25 attendees. A user may change the criteria and portion 310 may update in response to the change with requiring reloading the page, in various examples. As discussed previously, portion 302 may not change until a user indicates they are done customizing the long meeting exclusion by selecting the next button. User interface 500 does not include any exceptions; however, a word cloud and keyword search are presented if the user wishes to create an exception.

Figure 7:
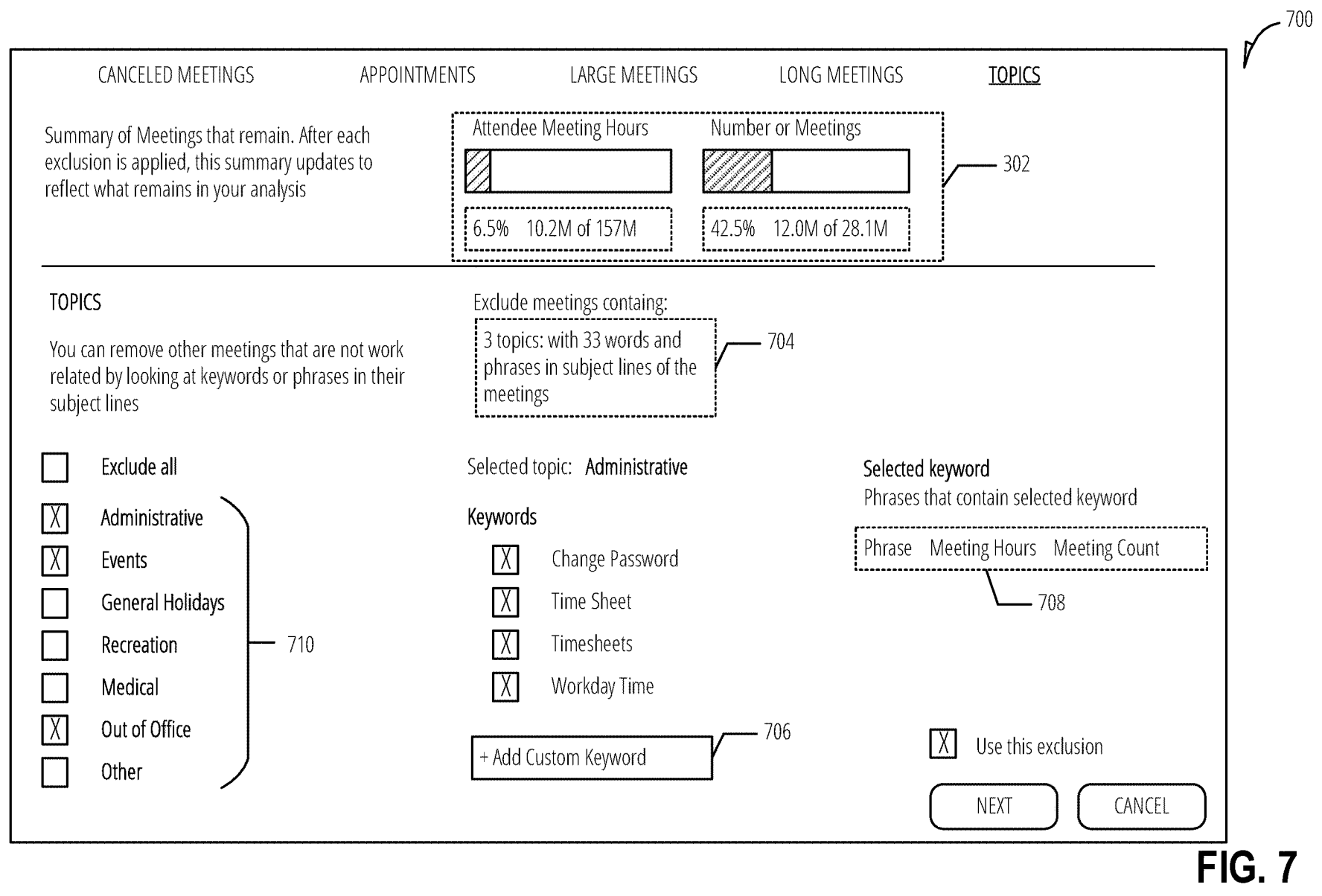

FIG. 7 is a user interface 700 for customizing a topics exclusion, according to various examples. User interface 700 is not illustrated as including an impact metric showing the effect of the topic exclusion rule, but the impact metric may be included in other examples. User interface 700 updates portion 302 to indicate the number of meetings and meeting hours after application of the other exclusion rules.

Unlike the other exception rules, the topics exclusion rule does not include an option to add an exception, in various examples. A user may create or edit a set of topics 710 that include one or more keywords or phrases. When a topic is enabled—as denoted by the checked box next to a topic—all meetings that include keywords/phrases in that topic in their subject lines are excluded. In various examples, a default set of topics with a default set of keywords are used, which may be customized by a user. Additionally, a custom topic may be used by a user to create to exclude meetings.

A topic may be selected for editing by clicking on it, in various examples. User interface 700 shows that the "Administrative" topic has been selected and includes four keywords/phrases. A keyword may be removed from a topic by unchecking it. Removing may delete the keyword from the topic in some examples. In other examples, removing may merely stop meetings that have that keyword in the subject line from being excluded. Input box 706 may be used to add additional keywords to a topic. Selecting (e.g., clicking) a keyword may cause portion 708 to update to show phrases containing the keyword information about the phrases similar to portion 414 discussed above.

After a user clicks the next button, a summary screen may be presented. The summary screen may present each exclusion rule and their respective impact metrics. If the user is satisfied, the user may click a save button to save the exclusion rule set. The percentages of the impact metrics may sum to greater than 100% because a meeting may meet more than one exclusion (e.g., have one attendee and be longer than eight hours). The summary screen may include an option next to each exclusion rule to edit the exclusion rule.

Figure 8:
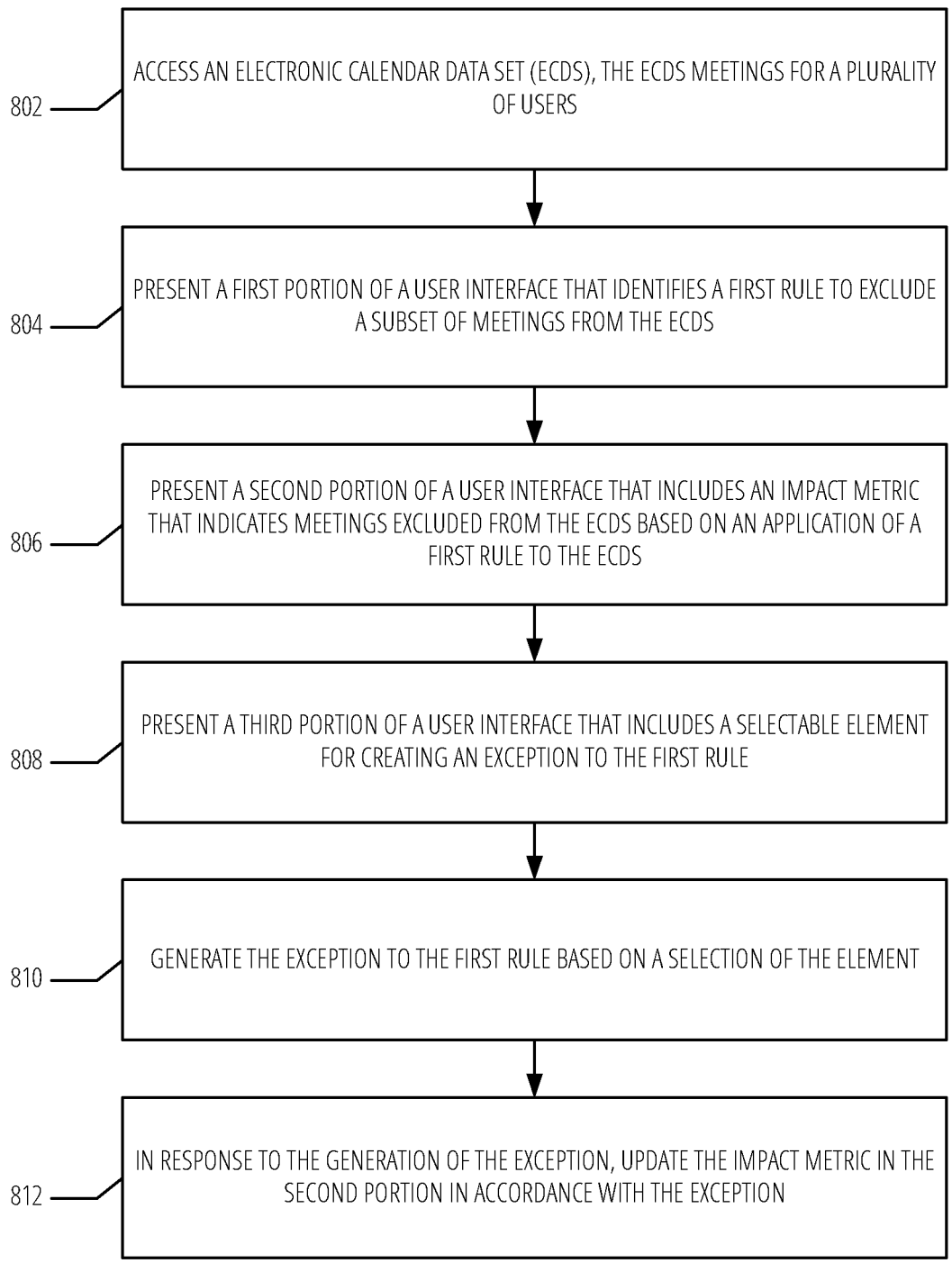
FIG. 8 is a flowchart illustrating a method to generate an exclusion rule, according to various examples.

FIG. 8 is a flowchart illustrating a method to generate an exclusion rule, according to various examples. The method is represented as a set of blocks that describe operations 802-812 of the method. The method may be embodied in a set of instructions stored in at least one computer-readable storage device of a computing device(s). A computer-readable storage device excludes transitory signals. In contrast, a signal-bearing medium may include such transitory signals. A machine-readable medium may be a computer-readable storage device or a signal-bearing medium. The computing device(s) may have one or more processors that execute the set of instructions to configure the one or more processors to perform the operations illustrated in FIG. 8. The one or more processors may instruct other component of the computing device(s) to carry out the set of instructions. For example, the computing device may instruct a network device to transmit data to another computing device or the computing device may provide data over a display interface to present a user interface. In some examples, performance of the method may be split across multiple computing devices using a shared computing infrastructure.

The method may include, at operation 802, accessing an electronic calendar data set (ECDS), the ECDS identifying meetings for a plurality of users. For example, the ECDS may be retrieved by querying a larger set of calendar data with a set of global rules as describe above. The accessing may occur at a system such as exclusion management system 104.

The method may include, at operation 804, presenting a user interface on a computing device that includes a first portion that identifies a first rule to exclude a subset of meetings from the ECDS. Presenting—in this operation and others—may include transmitting webpages for display on the computing device from a web server such as web server 106. Presenting may also include client-side processing of the webpage or use of a standalone client-side application. The user interface may be displayed in response to a user creating a new exclusion rule set. The first rule may be part of a default set of exclusion rules.

The first portion may identify a value of an attribute of a meeting for the first rule. The method may further include receiving a change to the value of the attribute and, in response to the change, update the impact metric. For example, the ECDS may be queried to determine the number of meetings that meet the new value. The attribute may be a length of a meeting or a number of attendees in various examples.

The method may include, at operation 806, presenting a user interface on a computing device that includes a second portion that includes an impact metric that indicates meetings excluded from the ECDS based on an application of a first rule to the ECDS. In various examples, the impact metrics indicates graphically or textually) a percentage of meetings excluded based on application of the first rule to the ECDS. The method may include, at operation 808, presenting a user interface on a computing device that includes a third portion that include a selectable element for creating an exception to the first rule.

In various examples, the ECDS may be queried to retrieve a plurality of keywords in subject lines of the meetings included in the subset of meetings. The selectable elements in the third portion may include a set of one or more keywords. A keyword may be selected and the ECDS may be queried to retrieve a number of meetings in the subset of meetings that include the keyword in the subject line. This information may be presented in the third portion in response to the selection. Each respective keyword displayed in the third portion is displayed at a size correlated to a frequency of use of the respective keyword in the subject lines of the subset of meetings. The information may also include phrases that include the keyword in the subject line in response to the selection. The phrases may be retrieved by querying ECDS.

The method may include, at operation 810, generating the exception to the first rule based on a selection of the element. The method may include, at operation 812, in response to the generation of the exception, updating the impact metric in the second portion in accordance with the exception. Updates to the impact metric may include updating the graphics or text based on the number of meetings in the subset of meetings that include the keyword in the subject line. For example, an update may include exclusion management system 104 transmitting a new number of meetings excluded by the meeting with the exception include for display in the second portion. In some examples, updating may include the computing device that is displaying the second portion formatting a request (e.g., via an API) exclusion management system 104 for the new number.

In various examples, the method may also include receiving a request to save the exception to the first rule. Saving may include activating or selecting a "next" button on the user interface to advance to another exclusion rule. In response, the various portions of the user interface may be updated. For example, the first portion may be updated to include a value of an attribute of a meeting of a second rule to exclude a subset of meetings from the ECDS, the second portion may be updated to include an impact metric that indicates a percentage of meetings excluded from the ECDS based on an application of the second rule to the ECDS, and the third portion may be updated to include selectable elements for creating an exception to the second rule. A fourth portion, which may also be presented for the first rule, may include an indication of a number of meetings excluded from the ECDS based on application of the first rule with any exceptions to the first rule. When the fourth portion is displayed with respect to the first rule, the indication may not be based on the application of the first rule.

In various examples, the portions of the user interface to present information for a third rule. In some examples, the third portion is removed for the third rule when the third rule is a keyword-based exclusion rule because there may be no exception. In place of the third portion, a fifth portion may be presented that lists a set of one or more topics that each include a set of keywords.

In various examples, a summary user interface may be presented that includes respective impact metrics for each of the respective rules in an exclusion rule set.

Example Computer System

Embodiments described herein may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, modules, or mechanisms. Modules may be hardware, software, or firmware communicatively coupled to one or more processors in order to carry out the operations described herein. Modules may hardware modules, and as such modules may be considered tangible entities capable of performing specified operations and may be configured or arranged in a certain manner. In an example, circuits may be arranged (e.g., internally or with respect to external entities such as other circuits) specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Figure 9:
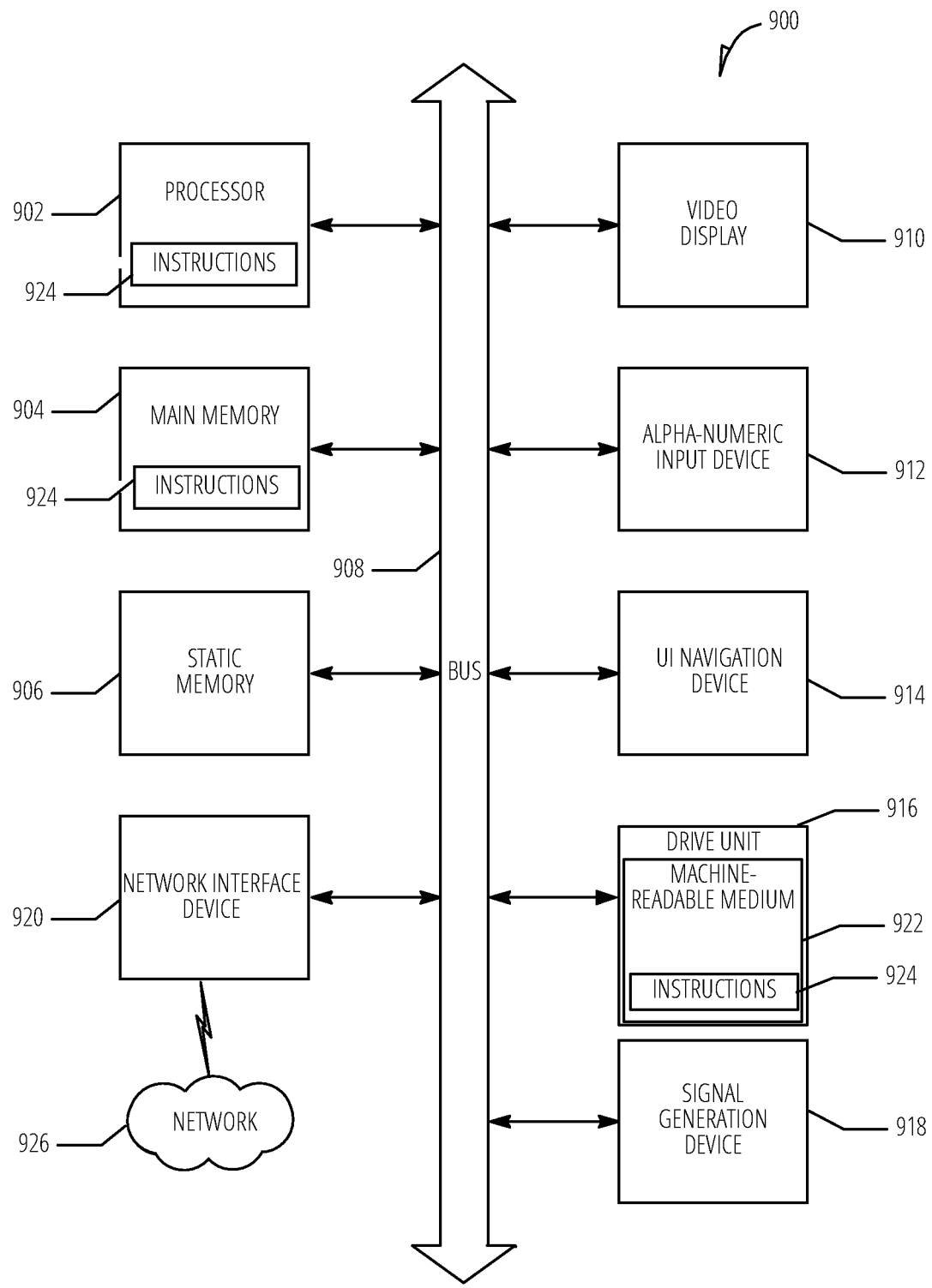
FIG. 9 is a block diagram illustrating an example machine upon which any one or more of the techniques (e.g., methodologies) discussed herein may be performed, according to an example embodiment.

FIG. 9 is a block diagram illustrating a machine in the example form of a computer system 900, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 900 includes at least one processor 902 (e.g., a central processing unit (CPU), a graphics processing unit (GPU) or both, processor cores, compute nodes, etc.), a main memory 904 and a static memory 906, which communicate with each other via a link 908 (e.g., bus). The computer system 900 may further include a video display unit 910, an alphanumeric input device 912 (e.g., a keyboard), and a user interface (UI) navigation device 914 (e.g., a mouse). In one embodiment, the video display unit 910, input device 912 and UI navigation device 914 are incorporated into a touch screen display. The computer system 900 may additionally include a storage device 916 (e.g., a drive unit), a signal generation device 918 (e.g., a speaker), a network interface device 920, and one or more sensors (not shown), such as a global positioning system (GPS) sensor, compass, accelerometer, or other sensor.

The storage device 916 includes a machine-readable medium 922 on which is stored one or more sets of data structures and instructions 924 (e.g., software) embodying or utilized by any one or more of the methodologies or functions described herein. The instructions 924 may also reside, completely or at least partially, within the main memory 904, static memory 906, and/or within the processor 902 during execution thereof by the computer system 900, with the main memory 904, static memory 906, and the processor 902 also constituting machine-readable media.

While the machine-readable medium 922 is illustrated in an example embodiment to be a single medium, the term "machine-readable medium" may include a single medium or multiple media (e.g., a centralized or distributed database, and/or associated caches and servers) that store the one or more instructions 924. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 924 may further be transmitted or received over a communications network 926 using a transmission medium via the network interface device 920 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., 3G, 4G LTE/LTE-A or WiMAX networks, and 5G). The term "transmission medium" shall be taken to include any intangible medium that is capable of storing, encoding, or carrying instructions for execution by the machine, and includes digital or analog communications signals or other intangible medium to facilitate communication of such software.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

What is claimed is:

1. A system comprising:
a processor;
a storage device comprising instructions, which when executed by the processor, configure the processor to:
access an electronic calendar data set (ECDS), the ECDS identifying meetings for a plurality of users;
generate a list of suggested keywords to exclude meetings from analysis, wherein keywords in the list of suggested keywords are automatically generated based on respective numbers of appearances of the suggested keywords in the ECDS for the meetings of the plurality of users;
present a user interface, the user interface including:
a first portion that identifies a first rule to exclude a subset of meetings from the ECDS;
a second portion that includes an impact metric that indicates meetings excluded from the ECDS based on an application of the first rule to the ECDS;
a third portion that includes the suggested keywords including a selectable element representing one of the suggested keywords, for creating an exception to the first rule, the selectable element presented in the third portion with a second selectable element representing another of the suggested keywords, wherein the selectable element is presented with at least one visual distinction from the second selectable element;
receive, via the third portion, a user selection of the one of the suggested keywords to activate the exception; and
in response to the activation of the exception, update display of the impact metric in the second portion in accordance with the exception, the updated display including a value of meeting hours that are excluded by the first rule.

2. The system of claim 1, wherein the instructions further configure the processor to:
query the ECDS to retrieve a plurality of keywords in subject lines of the meetings included in the subset of meetings, wherein a set of one or more of the keywords is presented as selectable elements in the third portion.

3. The system of claim 2, wherein the instructions further configure the processor to:
query, in response to a selection of a keyword in the set of selectable elements, the ECDS for a number of meetings in the subset of meetings that include the keyword in the subject line; and
present an indication of the number of the meetings in the third portion of the user interface.

4. The system of claim 3, wherein the impact metric indicates a percentage of meetings excluded based on application of the first rule, and wherein to update the impact metric in accordance with the exception, the percentage of meetings is decreased based on the number of the meetings.

5. The system of claim 3, wherein the third portion of the user interface presents phrases that include the keyword in the subject line in response to the selection.

6. The system of claim 2, wherein each respective keyword displayed in the third portion is displayed at a size correlated to a frequency of use of the respective keyword in the subject lines of the subset of meetings.

7. The system of claim 1, wherein the instructions, which when executed by the processor, further configure the processor to:
receive a request to save the exception to the first rule;
in response to the request, update the user interface, wherein:
the first portion is updated to include a parameter of a second rule to exclude a subset of meetings from the ECDS;
the second portion is updated to include an impact metric that indicates a percentage of meetings excluded from the ECDS based on an application of the second rule to the ECDS; and
the third portion is updated to include selectable elements for creating an exception to the second rule; and
a fourth portion of the user interface includes an indication of a number of meetings excluded from the ECDS based on application of the first rule with any exceptions to the first rule.

8. The system of claim 1, wherein the first portion identifies a value of an attribute of a meeting for the first rule.

9. The system of claim 8, wherein the instructions, which when executed by the processor, further configure the process to:
receive a change to the value of the attribute; and
in response to the change, update the impact metric.

10. The system of claim 8, wherein the attribute is a length of a meeting.

11. The system of claim 8, wherein the attribute is a number of attendees in a meeting.

12. A computer-implemented method comprising:
accessing an electronic calendar data set (ECDS), the ECDS identifying meetings for a plurality of users;
generating a list of suggested keywords to exclude meetings from analysis, wherein keywords in the list of suggested keywords are automatically generated based on respective numbers of appearances of the suggested keywords in the ECDS for the meetings of the plurality of users;
presenting a user interface, the user interface including:

a first portion that identifies a first rule to exclude a subset of meetings from the ECDS;

a second portion that includes an impact metric that indicates meetings excluded from the ECDS based on an application of the first rule to the ECDS;

a third portion that includes the suggested keywords including a selectable element representing one of the suggested keywords, for creating an exception to the first rule the selectable element presented in the third portion with a second selectable element representing another of the suggested keywords, wherein the selectable element is presented with at least one visual distinction from the second selectable element;

receiving, via the third portion, a user selection of the one of the suggested keywords to activate the exception; and in response to the activation of the exception, updating display of the impact metric in the second portion in accordance with the exception, the updated display including a value of meeting hours that are excluded by the first rule.

13. The method of claim 12, further comprising:

querying the ECDS to retrieve a plurality of keywords in subject lines of the meetings included in the subset of meetings, wherein a set of one or more of the keywords is presented as selectable elements in the third portion.

14. The method of claim 13, further comprising:

querying, in response to a selection of a keyword in the set of selectable elements, the ECDS for a number of meetings in the subset of meetings that include the keyword in the subject line; and presenting an indication of the number of the meetings in the third portion of the user interface.

15. The method of claim 14, wherein the impact metric indicates a percentage of meetings excluded based on application of the first rule, and wherein to update the impact metric in accordance with the exception, the percentage of meetings is decreased based on the number of the meetings.

16. The method of claim 14, wherein the third portion of the user interface presents phrases that include the keyword in the subject line in response to the selection.

17. The method of claim 13, wherein each respective keyword displayed in the third portion is displayed at a size correlated to a frequency of use of the respective keyword in the subject lines of the subset of meetings.

18. The method of claim 12, further comprising:

receiving a request to save the exception to the first rule;

in response to the request, updating the user interface, wherein:

the first portion is updated to include a parameter of a second rule to exclude a subset of meetings from the ECDS;

the second portion is updated to include an impact metric that indicates a percentage of meetings excluded from the ECDS based on an application of the second rule to the ECDS; and the third portion is updated to include selectable elements for creating an exception to the second rule; and a fourth portion of the user interface includes an indication of a number of meetings excluded from the ECDS based on application of the first rule with any exceptions to the first rule.

19. The method of claim 12, wherein the first portion identifies a value of an attribute of a meeting for the first rule.

20. A storage device comprising instructions, which when executed by at least one processor, configure the at least one processor to:

access an electronic calendar data set (ECDS), the ECDS identifying meetings for a plurality of users;

generate a list of suggested keywords to exclude meetings from analysis, wherein keywords in the list of suggested keywords are automatically generated based on respective numbers of appearances of the suggested keywords in the ECDS for the meetings of the plurality of users;

present a user interface, the user interface including:

a first portion that identifies a first rule to exclude a subset of meetings from the ECDS;

a second portion that includes an impact metric that indicates meetings excluded from the ECDS based on an application of the first rule to the ECDS;

a third portion that includes the suggested keywords including a selectable element representing one of the suggested keywords, for creating an exception to the first rule, the selectable element presented in the third portion with a second selectable element representing another of the suggested keywords, wherein the selectable element is presented with at least one visual distinction from the second selectable element;

receive, via the third portion, a user selection of the one of the suggested keywords to activate the exception; and in response to the activation of the exception, update display of the impact metric in the second portion in accordance with the exception, the updated display including a value of meeting hours that are excluded by the first rule.

* * * * *